Patented Dec. 17, 1946

2,412,679

UNITED STATES PATENT OFFICE 2,412,679

PREPARATION OF ORGANIC SULFONATES AND SULFONYL CHLORIDES

Henry M. Grubb and Elton B. Tucker, Highland, Ind., assignors to Standard Oil Company, Chicago, Ill., a corporation of Indiana No Drawing. Application November 15, 1945, Serial No. 628,992

13 Claims. (Cl. 260—513)

This invention relates to improvements in the preparation of hydrocarbon sulfonyl chlorides and sulfonates and more particularly to the preparation of hydrocarbon sulfonyl chlorides and sulfonates in the absence of light by the use of organic peroxides.

It is known to prepare hydrocarbon sulfonyl chlorides particularly from aliphatic hydrocarbons and the higher alkyl monocyclic aromatic hydrocarbons by reacting the same with sulfuryl chloride in the presence of certain organic nitrogen compounds and light. Kharasch and Read (Journal of the American Chemical Society, volume 61 (1939), 308–9) describe the sulfonation of aliphatic hydrocarbons and higher alkyl monocyclic hydrocarbons with sulfuryl chloride in the presence of light using as catalyst certain organic nitrogen compounds, the most effective being the aromatic nitrogen ring compounds such as pyridines and quinolines. In general, organic nitrogen compounds, except those compounds which are bromination and oxidation inhibitors, for example, diphenyl amine, paraphenylenediamine, etc., can be used with varying degrees of effectiveness. The reaction of these hydrocarbons with sulfuryl chloride in the presence of these organic nitrogen compounds and light favors the formation of hydrocarbon sulfonyl chloride, which can be converted to the sulfonates by hydrolysis.

In another type of reaction hydrocarbon sulfonates can be obtained by reacting suitable hydrocarbons with a gaseous mixture of sulfur dioxide and chlorine in the presence of light, and subsequently hydrolyzing the reaction product to obtain the corresponding sulfonates. The sulfonation of hydrocarbons by treatment with gaseous mixtures of sulfur dioxide and chlorine is described in United States Patents Nos. 2,263,312, 2,197,800, Re. 20,968 and 2,202,791.

The use of strong illumination required in the above reactions presents several difficulties and disadvantages when the reactions are carried out in commercial size reactors. In some cases the reaction mixture darkens during the process and catalysis by light of the darkened reactants becomes difficult or impossible. There are also some hazards involved in the use of strong illumination particularly when inflammable solvents are employed in the process.

It is an object of the present invention to provide a method of accelerating the reaction between hydrocarbons and a mixture of sulfur dioxide and chlorine in the absence of light. Another object of the invention is to provide an improved method of preparing hydrocarbon sulfonyl chlorides and/or sulfonates without the necessity of providing illumination for catalyzing the reaction.

A further object of the invention is to provide an improved and rapid method of preparing hydrocarbon sulfonyl chlorides and hydrocarbon sulfonates by reacting suitable hydrocarbons with a mixture of sulfur dioxide and chlorine in the absence of light.

Other objects and advantages of the present invention will become apparent as the description thereof proceeds.

We have discovered that the foregoing objects can be attained by reacting a hydrocarbon with a mixture of sulfur dioxide and chlorine in the presence of an organic peroxide in the absence of light. Suitable organic peroxides are aliphatic or aromatic peroxides such as for example, benzoyl peroxide, lauroyl peroxide, phthalyl peroxide and the like.

The sulfonation can be accomplished in the dark in the presence of the organic peroxide by reacting the hydrocarbon with a mixture of sulfur dioxide and chlorine, and while we prefer to use a mixture of gaseous sulfur dioxide and chlorine, one or both of these reactants may be entirely or partly in the liquid phase.

The hydrocarbon used in the reaction should be substantially free of polycyclic aromatic hydrocarbons and organic sulfur compounds such as mercaptans and organic sulfides since we have found that their presence materially decreases the yield of the desired hydrocarbon sulfonyl chloride or the hydrocarbon sulfonate. Suitable hydrocarbon starting materials are therefore the aliphatic hydrocarbons, the alicyclic hpdrocarbons, or the higher alkyl monocyclic aromatic hydrocarbons. Hydrocarbon mixtures which are predominantly paraffinic or aliphatic, such as petroleum oil fractions ranging from liquefied normally gaseous hydrocarbons such as propane and butane to heavier hydrocarbons such as oil fractions having viscosities ranging from 50 to about 75 seconds and up to about 800 or more seconds Saybolt Universal at 100° F. can be employed.

When petroleum oil fractions are used as a starting material it is preferable that the same be refined in order to obtain a product which is substantially free of polycyclic aromatics and sulfur compounds. Such refining treatments include treatment with concentrated or fuming sulfuric acid and/or extraction with suitable solvents such as Chlorex, liquefied $SO_2$, furfural, phenol, liquefied normally gaseous hydrocarbons such as propane and butane, nitrobenzene, nitromethane and other known suitable solvents.

The reaction can be carried out at temperatures of from about −20° F. to about 300° F., although we prefer to use a temperature within the range of from about 100° F. to about 200° F. When the reaction is carried out with a mixture of gaseous sulfur dioxide and chlorine, the hydrocarbon reactant may also be in the gaseous phase, although we prefer to maintain the hydrocarbon in the liquid phase; when one or both of the sulfur dioxide and chlorine is employed in the liquid phase or partially in the liquid phase, the reaction is carried out at a pressure sufficient to maintain one or more of the reactants in the liquid phase. The amount of the organic peroxide employed may be from about 0.01% to about 1% of the hydrocarbon or hydrocarbon mixture employed. The relative amount of sulfonating agent to the hydrocarbon or hydrocarbon mixture undergoing sulfonation on a molal basis is within the range of from about 0.25 to about 10.0, depending on whether it is desired to produce monosulfonates or polysulfonates, and also depending on the efficiency with which the sulfonating reagents produce sulfonates. For example, sulfonation of a certain oil until an average of 1.5 sulfonyl groups per hydrocarbon molecule have been introduced appears to produce a maximum yield of disulfonate, together with monosulfonate and higher polysulfonates, while some of the oil remains unsulfonated.

The following examples are illustrative of the present invention in which a mixture of gaseous sulfur dioxide and chlorine is bubbled through a hydrocarbon, maintained in the liquid phase, in the presence of a small amount of benzoyl peroxide, in the dark. After about 25–75% of the hydrocarbon material has reacted the passage of the gaseous mixture is stopped and the reaction mixture blown with air to remove HCl and unreacted sulfur dioxide and chlorine. The reaction product comprising substantially hydrocarbon sulfonyl chlorides and some unreacted hydrocarbon together with some chlorinated hydrocarbon and chlorosulfonyl chlorides can be converted to the sulfonates by reaction with strong alkali solutions.

*Example I*

A mixture of $SO_2$ and $Cl_2$ gases (approximately 2:1 volume ratio) was bubbled into 140 grams of a highly refined oil at 131° F. Light was excluded and benzoyl peroxide (about 1 gram) was added incrementally. A yield of 16 grams of 100% soap was obtained on hydrolysis of the sulfonyl chlorides.

*Example II*

Under conditions substantially identical with those given in Example I, except that no peroxide was used, a yield of 5.1 grams of pure soap was produced.

*Example III*

A mixture of $SO_2$ and $Cl_2$ gases (approximately 2:1 ratio) was bubbled into 140 grams of octane at 138° F. until a weight gain of 20.5 grams resulted. Light was excluded and about 0.75 gram of benzoyl peroxide was added incrementally during the course of the reaction. A yield of 32.8 grams of sodium octyl sulfonate resulted from hydrolysis of the sulfonyl chlorides with strong caustic. This represents an efficiency of about 64% in utilization of $Cl_2$ based on the amount of $Cl_2$ reacting.

Instead of hydrolyzing the hydrocarbon sulfonyl chlorides with sodium hydroxide solutions other alkali metal hydroxides such as potassium hydroxide can be used, as well as the alkaline earth hydroxides and oxides. The alkaline earth sulfonates can be obtained by hydrolyzing the sulfonyl chloride with an alkaline earth hydroxide or oxide, or the alkali metal sulfonate can be treated with an alkaline earth oxide or chloride, and the alkaline earth sulfonate obtained. For example, the alcoholic solution of sodium sulfonate can be treated with lime or with calcium chloride to obtain the corresponding calcium sulfonate.

The preparation of sulfonates from sulfonyl chlorides obtained by treating hydrocarbons or hydrocarbon mixtures in the absence of light with a mixture of $SO_2$ and $Cl_2$, in the presence of an organic peroxide as above described, is also well adapted to similar treatment of certain other liquid organic compounds or organic compounds capable of being readily liquefied, such as ethers and monocarboxylic acids other than formic and acetic acid.

The sulfonates obtained by the foregoing described process are suitably employed as surface-active agents, such as detergents, wetting agents, etc.

This application is a continuation-in-part of our copending application Serial No. 542,241, filed June 26, 1944, which is a division of our application Serial No. 449,160 filed June 30, 1942, and issued as U. S. 2,374,191 on April 24, 1945.

While the present invention has been described in connection with certain specific embodiments thereof, it is to be understood that it is not intended that the same shall be limitative of the scope of the invention except insofar as included in the accompanying claims.

We claim:

1. The process comprising reacting an organic compound selected from the class consisting of aliphatic hydrocarbons, alicyclic hydrocarbons and higher alkyl monocyclic hydrocarbons and mixtures thereof in the dark with a mixture of sulfur dioxide and chlorine in the presence of a small amount of an organic peroxide.

2. The process of sulfurylating an organic compound selected from the class consisting of aliphatic hydrocarbons, alicyclic hydrocarbons and higher alkyl monocyclic aromatic hydrocarbons comprising reacting said organic compound in the dark with a gaseous mixture of sulfur dioxide and chlorine in the presence of an organic peroxide.

3. The method of sulfurylating an organic compound as described in claim 2 in which the organic peroxide is an aromatic peroxide.

4. The method of sulfurylating an organic compound as described in claim 2, in which the organic peroxide is a benzoyl peroxide.

5. The process of sulfurylating an organic compound as described in claim 2 in which the organic peroxide is an aliphatic peroxide.

6. The process of sulfurylating an organic compound as described in claim 2 in which the organic peroxide is a lauroyl peroxide.

7. The process of sulfonating a hydrocarbon selected from the class consisting of an aliphatic hydrocarbon, an alicyclic hydrocarbon and a higher alkyl monocyclic aromatic hydrocarbon, and mixtures thereof, comprising reacting said hydrocarbon in the dark with a mixture of sulfur dioxide and chlorine in the presence of a small amount of an organic peroxide and subsequently hydrolyzing the resultant product with a basic hydrolyzing agent.

8. The method of sulfonating hydrocarbons selected from the class consisting of aliphatic hydrocarbons, alicyclic hydrocarbons, higher alkyl monocyclic aromatic hydrocarbons and mixtures thereof comprising reacting said hydrocarbons in the dark with a gaseous mixture of sulfur dioxide and chlorine in the presence of a small amount of an organic peroxide and subsequently hydrolyzing the resultant product with a basic hydrolyzing agent.

9. The method of sulfonating hydrocarbons as described in claim 8 in which the organic peroxide is an aromatic peroxide and the hydrolyzing agent is an alkali metal hydroxide.

10. The method of sulfonating hydrocarbons as described in claim 8 in which the organic peroxide is benzoyl peroxide and the hydrolyzing agent is sodium hydroxide.

11. The method of sulfonating hydrocarbons as described in claim 8 in which the organic peroxide is an aliphatic peroxide.

12. The method of sulfonating hydrocarbons as described in claim 8 in which the hydrolyzing agent is an alkaline earth hydroxide.

13. The method of sulfonating hydrocarbons as described in claim 8 in which the hydrolyzing agent is calcium hydroxide.

HENRY M. GRUBB.
ELTON B. TUCKER.